(12) United States Patent
Lerenius et al.

(10) Patent No.: US 7,443,566 B2
(45) Date of Patent: Oct. 28, 2008

(54) LOW POWER, CONFIGURABLE DISPLAY FOR MOBILE DEVICES

(75) Inventors: Jacob Lerenius, Kista (SE); Håkan Carlberg, Kista (SE)

(73) Assignee: Sony Ericsson Mobile Communications AB, Lund (SE)

( * ) Notice: Subject to any disclaimer, the term of this patent is extended or adjusted under 35 U.S.C. 154(b) by 342 days.

(21) Appl. No.: 11/372,058

(22) Filed: Mar. 10, 2006

(65) Prior Publication Data

US 2007/0211328 A1   Sep. 13, 2007

(51) Int. Cl.
*G02F 1/15* (2006.01)
*G09G 3/38* (2006.01)
*H04M 1/00* (2006.01)

(52) U.S. Cl. ............ 359/265; 345/105; 455/575.1
(58) Field of Classification Search ........ 345/105; 359/265; 455/575.1
See application file for complete search history.

(56) References Cited

U.S. PATENT DOCUMENTS

| | | | |
|---|---|---|---|
| 6,035,180 A | 3/2000 | Kubes et al. | |
| 6,277,523 B1 | 8/2001 | Giron | |
| 6,608,996 B1 * | 8/2003 | Laurikka et al. | 455/90.3 |
| 6,639,709 B2 | 10/2003 | Vincent et al. | |
| 6,642,069 B2 | 11/2003 | Armgarth et al. | |
| 6,744,549 B2 | 6/2004 | Vincent et al. | |
| 6,879,424 B2 | 4/2005 | Vincent et al. | |
| 7,113,196 B2 * | 9/2006 | Kerr | 345/83 |
| 7,248,239 B2 * | 7/2007 | Dowling et al. | 345/83 |
| 2003/0134613 A1 | 7/2003 | Latto et al. | |
| 2004/0211989 A1 | 10/2004 | Armgarth et al. | |
| 2004/0253439 A1 | 12/2004 | Martin et al. | |
| 2005/0052349 A1 * | 3/2005 | Kuczynski et al. | 345/49 |
| 2005/0243400 A1 | 11/2005 | Brabec et al. | |
| 2006/0018001 A1 | 1/2006 | Kojima et al. | |

FOREIGN PATENT DOCUMENTS

| | | |
|---|---|---|
| EP | 0 564 127 A2 | 10/1993 |
| EP | 1 467 536 A1 | 10/2004 |

(Continued)

OTHER PUBLICATIONS

International Search Report and Written Opinion dated Mar. 20, 2007, issued in corresponding PCT Application No. PCT/IB2006/002498.

(Continued)

*Primary Examiner*—David N Spector
(74) *Attorney, Agent, or Firm*—Harrity & Harrity, LLP

(57) ABSTRACT

A method and apparatus for modifying an appearance of a mobile terminal are provided. A mobile terminal housing is provided with a window. A first electrode is formed inside the window. A conductive polymer layer is formed over the first electrode. An electrolyte layer is formed over the conductive polymer layer. An ion storage layer is formed in contact with the electrolyte layer. A second electrode is formed in contact with the ion storage layer. A power supply is provided for supplying a voltage to the first electrode and the second electrode, where a state of the conductive polymer layer changes from a first uncolored state to a second colored state upon application of the voltage and where the changing of the state of the conductive polymer layer modifies a visual appearance of the housing.

29 Claims, 6 Drawing Sheets

FOREIGN PATENT DOCUMENTS

WO     WO 03/075254 A1     9/2003

OTHER PUBLICATIONS

H. Heuer et al., "Electrochromic Window Based on Conducting Poly(3,4-ethylenedioxythiophene)-Poly(styrene sulfonate)", XP-001123863, pp. 89-94, Feb. 2002.

M. Chen, "Printed Electrochemical Devices Using Conducting Polymers as Active Materials on Flexible Substrates", XP-002422618, pp. 1339-1347, Jul. 2005.

International Preliminary Report on Patentability dated Jun. 4, 2008 issued in corresponding PCT application No. PCT/IB2006/002498, 13 pages.

* cited by examiner

LOW POWER, CONFIGURABLE DISPLAY FOR MOBILE DEVICES

TECHNICAL FIELD OF THE INVENTION

The present invention relates to illuminated display elements in an electronic apparatus. More specifically, a portion of the electronic apparatus is configured to include one or more display elements responsive to events occurring in the electronic apparatus.

DESCRIPTION OF RELATED ART

The popularity and use of mobile terminals or mobile telephones has skyrocketed over the past 20 years. People now take their mobile terminals with them everywhere and use them for a multitude of functions. In addition to making and receiving telephone calls, the mobile terminals also may function as personal digital assistants, which have calendars, task managers, note managers and many other functions.

Typical mobile terminals include one or more high resolution displays for providing a visual interface with the mobile terminal. For example, a mobile terminal's high resolution display may include a liquid crystal display (LCD) capable of displaying telephone call information, contact information, menu navigation systems, photographs, etc. Unfortunately, these high resolution LCD displays typically require significant power to operate. Consequently, operation over an extended time may adversely affect battery performance of the mobile terminal. In addition to displays, conventional mobile terminals also include device housings, input/output devices (e.g., keypads), cameras, and antennas.

As the popularity of mobile terminals has increased, so has the desire to alter the visual style of the devices. For example, mobile terminal users may purchase protective covers and even decorative jewelry to adorn their mobile terminals. As mobile terminals continue to become even more ubiquitous, the desire to personalize may increase even further.

SUMMARY OF THE INVENTION

According to an embodiment consistent with principles of the invention, a mobile terminal may be provided. The mobile terminal may include a housing having a window. A first electrode may be formed over the window. A conductive polymer layer may be formed over the electrode. An electrolyte layer may be formed over the conductive polymer layer. An ion storage layer may be formed in contact with the electrolyte layer. A second electrode may be formed in contact with the ion storage layer. The mobile terminal may further include a power supply for providing a voltage to the first electrode and the second, wherein a state of the conductive polymer layer changes from a first uncolored state to a second colored state upon application of the voltage; and wherein the changing of the state of the conductive polymer layer modifies a visual appearance of the housing.

The window may be a transparent window

The housing may include a plurality of transparent windows.

The mobile terminal may include a plurality of transparent windows formed into a preconfigured design.

The electrode may be a frame formed inside the window.

The electrode may comprise a conductive metal.

The conductive polymer layer may be viewable through the window and the electrode.

The first uncolored state of the conductive polymer layer corresponds to an oxidation state of the conductive polymer and the second colored state corresponds to a reduction state of the conductive polymer.

The conductive polymer layer may comprise poly(3,4-ethylenedioxythiopene) doped with poly(styrene sulphonic acid).

The conductive polymer layer may be applied by spin coating.

The conductive polymer layer may have a thickness ranging from about 100 nm to about 5000 nm.

The conductive polymer layer may include a painted inner surface.

The electrolyte layer may be a salt applied as a gel.

The housing may include a second window, where the second electrode is formed inside of the second window, and where the ion storage layer comprises a second conductive polymer layer formed over the second electrode.

The state of the conductive polymer layer may be changed from a first uncolored state to a second colored state upon application of a voltage ranging from about 0.6 volts to about 2.0 volts.

The mobile terminal may further include a transistor element operatively coupled to the power supply and the conductive polymer layer. Logic may be configured to address the transistor element to provide power from the power supply to the conductive polymer layer.

The mobile terminal having may also include a second window, where the second electrode may be formed inside the second window. A second conductive polymer layer may be formed over the second electrode, where the electrolyte layer may be formed over and between the conductive polymer layer and the second conductive polymer layer. A state of the conductive polymer layer may change from a first uncolored state to a second colored state and a state of the second conductive polymer layer changes from a first colored state to a second uncolored state upon application of the voltage. The changing of the state of the conductive polymer layer and the second conductive polymer layer may modify a visual appearance of the housing.

According to another embodiment consistent with principles of the invention a method may be provided for changing an appearance of a mobile terminal. The method may include providing a mobile terminal housing with a window; forming an electrode layer over the window; forming a conductive polymer layer over the electrode layer; forming an electrolyte layer over the conductive polymer layer; forming an ion storage layer in electrical connection with the electrolyte layer; forming a a second electrode in electrical connection with the ion storage layer; and applying a voltage to the first electrode and the second electrode, where the applying a voltage causes the conductive polymer layer to transition from a first visual state to a second visual state.

The method may include forming the window of a mask design.

The transparent window may comprise a majority of a surface of the housing.

The first visual state may be a substantially transparent visual state and the second visual state may be a substantially opaque state.

The method may further include applying a first voltage between the first electrode and the second electrode to change the conductive polymer layer from the first visual state to the second visual state; and applying a second voltage opposite to the first voltage between the first electrode and the second electrode to change the conductive polymer layer from the second visual state to the first visual state.

According to yet another embodiment of the invention, a system may include a mobile telephone housing having a first transparent or semi-transparent region and a second transparent or semitransparent region formed therein. A first electrode may be formed behind the first transparent or semi-transparent region. A second electrode may be formed behind the second transparent or semi-transparent region. A first conductive polymer region may be formed behind the first electrode, the first conductive polymer region visible through the at least one transparent or semi-transparent region. A second conductive polymer region may be formed behind the second electrode, the second conductive polymer region visible through the at least one transparent or semi-transparent region. An electrolyte layer may be formed over the first and second conductive polymer regions. Logic may be configured to respond to an event, where, in response to the event, the logic causes a voltage to be supplied from a power source to the first and second electrodes, thereby modifying a color state of the conductive polymer region.

The event may include a user interaction with an input device associated with the mobile telephone.

The user interaction may include a user interaction with a menu driven display on the mobile terminal.

The event may include a mobile telephone alert.

The mobile telephone alert may include an incoming call alert.

The mobile telephone alert may include an incoming message alert.

The mobile telephone housing may include a plurality of transparent or semi-transparent regions configured into a design pattern.

Each of the plurality of transparent or semi-transparent regions may include a respective electrode formed over the transparent or semi-transparent region, a conductive polymer layer formed over the electrode, an electrolyte layer formed over the conductive polymer layer, electrolyte layer being in electrical contact with at least one other conductive polymer layer. The logic may be configured to selectively modify a color of each of the plurality of conductive polymer regions.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1A:
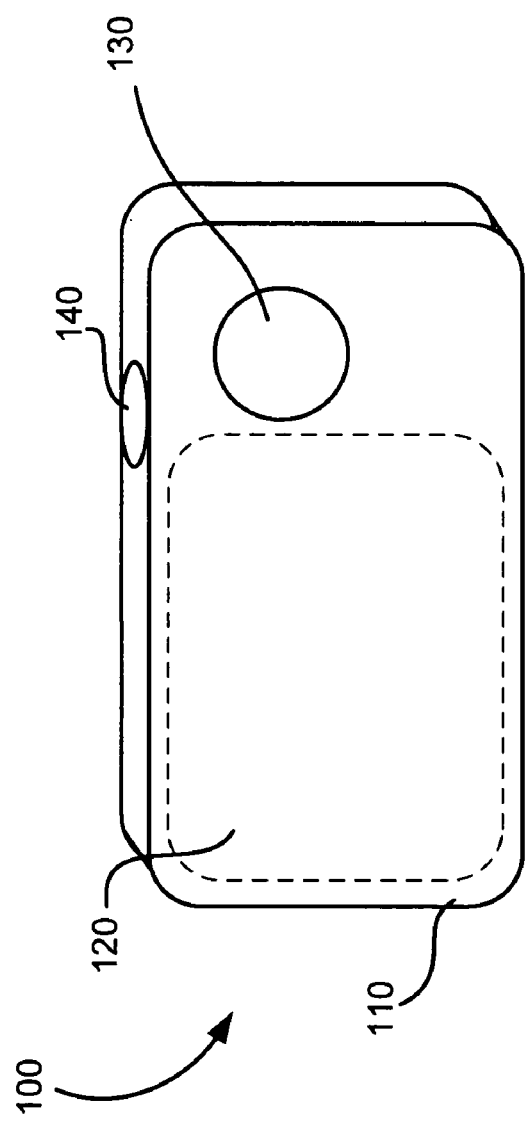
FIGS. 1A and 1B are front views of exemplary mobile terminals in which methods and systems consistent with the invention may be implemented.

FIG. 1A is a front view of an exemplary mobile terminal device 100 in which systems and methods consistent with the invention may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also optionally include a camera. Moreover, mobile terminals may include a wide variety of form factors including, candy bar, clamshell, flip, slider, and swivel or pivot style. It should be understood that the principles of the invention may applied to mobile terminals regardless of form factor.

Referring to FIG. 1A, mobile terminal 100 may include housing or cover 110 having a configurable display area 120. Additionally, mobile terminal may optionally include a camera lens 130 and shutter button 140. Housing 110 may protect the components of mobile terminal 100 from outside elements. Configurable display area 120 will be described in additional detail below and may include one or more display elements for providing low power design or alert elements within housing 110. Camera lens 130 may focus light and may include a number of lens elements. A lens cover (not shown) may be controlled to uncover lens 130 to permit the user to take pictures and cover lens 120 when the camera is not in use, as described in detail below. Shutter button 140 may be pressed by a user to take a picture.

Figure 1B:
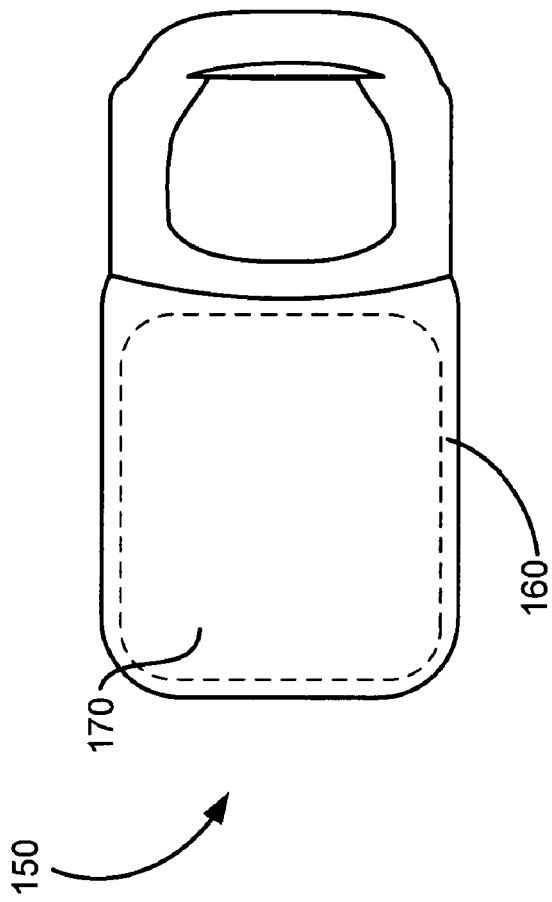

FIG. 1B is a front view of another exemplary mobile terminal device 150 in which systems and methods consistent with the invention may be implemented. Similar to mobile terminal device 100, mobile terminal device 150 may include a housing 160 and a configurable display area 170. Mobile terminal 150 may have a clamshell or "flip" form factor that opens to reveal a high resolution display and keypad.

Figure 2:
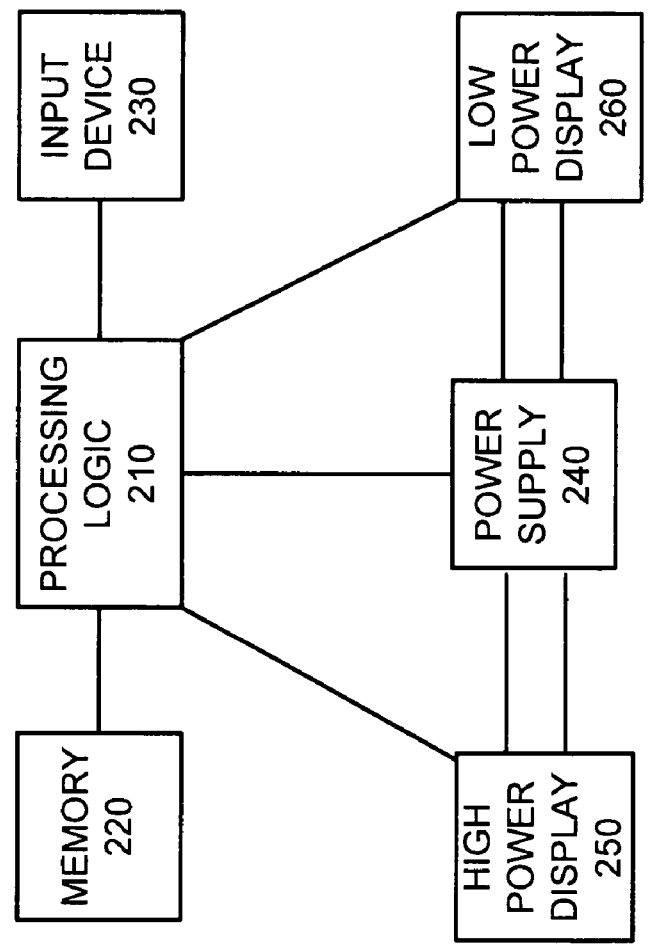
FIG. 2 is a block diagram illustrating components of the mobile terminal of FIG. 1 according to an exemplary implementation consistent with the invention.

FIG. 2 is a diagram illustrating some components of mobile terminal 100 according to an exemplary implementation consistent with the invention. Mobile terminal 100 may include processing logic 210, memory 220, input device 230, power supply 240, high power display 250, and a low power configurable display 260. One skilled in the art would recognize that the mobile terminal 100 may be configured in a number of other ways and may include other or different elements, such as one or more radio frequency (RF) antennas, a transceiver, modulator/demodulator, encoder/decoder, a speaker, etc.

Processing logic 210 may include a processor, microprocessor, an application specific integrated circuit (ASIC), field programmable gate array (FPGA) or the like. Processing logic 210 may execute software programs or data structures to control operation of mobile terminal 100. Memory 220 may include a random access memory (RAM) or another type of dynamic storage device that stores information and instructions for execution by processing logic 210; a read only memory (ROM) or another type of static storage device that stores static information and instructions for use by processing logic 210; and/or some other type of magnetic or optical recording medium and its corresponding drive. Instructions used by processing logic 210 may also, or alternatively, be stored in another type of computer-readable medium accessible by processing logic 210. A computer-readable medium may include one or more memory devices and/or carrier waves.

Input device 230 may include any mechanism that permits an operator to input information to mobile terminal 100, such as a microphone, a keyboard, a keypad, a mouse, a pen, stylus, touch screen display, voice recognition and/or biometric mechanisms, etc. Input device 230 may also include a button that allows a user to receive a menu of options high power display 250.

Power supply 240 may supply power to components of mobile terminal 100, such as high power display 250 and low power, configurable display 260. High power display 250 may facilitate the display of various types of information to a user including, for example, telephone call information, phone or address book information, etc. Additionally, high power display 250 may provide a high resolution interface for viewing interactive menus, web browsers, photographs, etc. As mentioned briefly above, high power display 250 is typically formed of a liquid crystal display. In one exemplary implementation consistent with principles of the invention, low power configurable display 260 may be configured to provide dynamic display or alert capabilities without requiring significant power consumption. Specificities of low power configurable display 260 will be described in detail below.

Mobile terminal 100, consistent with the invention, may perform processing associated with, for example, dynamically modifying configurable display 260 (areas 120 and 170 of FIGS. 1A and 1B, respectively). Mobile terminal 100 may perform these operations in response to processing logic 210 executing sequences of instructions contained in a computer-readable medium, such as memory 220 and optionally in response to user interaction through input device 230. It should be understood that a computer-readable medium may include one or more memory devices and/or carrier waves. Execution of sequences of instructions contained in memory 220 causes processing logic 210 and/or low power display 260 to perform acts that will be described hereafter. As described below, hard-wired circuitry may be used in combination with software instructions to implement processes consistent with the invention. Thus, implementations consistent with the invention are not limited to any specific combination of hardware circuitry and software.

Figure 3A:
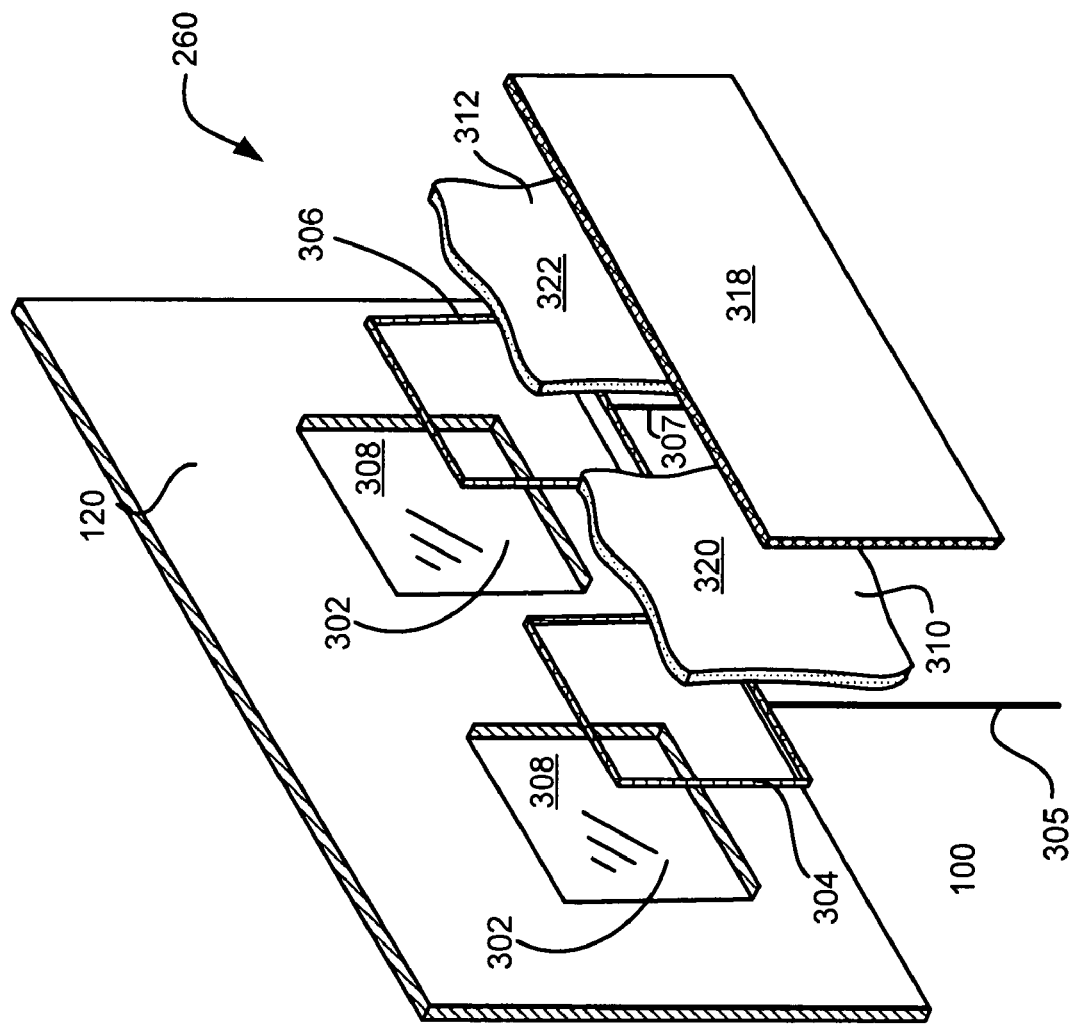
FIGS. 3A-3B are exploded isometric illustrations of configurable display areas according to two implementations consistent with principles of the invention.

FIG. 3A is an exploded isometric illustration of a configurable display area 260 according to one implementation consistent with principles of the invention. Configurable display area 260 (e.g., area 120 in FIG. 1A) may include windows 302, electrodes 304 and 306, contacts 305 and 307, conductive polymer layers 310, 312, and an electrolyte layer 318. As described above, configurable display area 120 may be included or incorporated within a housing 110 of mobile terminal 100 as shown in FIG. 1A. In one exemplary implementation, configurable display area 120 of housing 110 may include one or more windows or openings 302 formed of a transparent material, such as a transparent plastic. In one embodiment, all of most of housing 110 may be formed of the transparent material. Electrodes 304 and 306 may then be formed over windows 302.

In one embodiment consistent with principles of the invention, electrodes 304 and 306 may include a metal or other conductive material formed into a frame or band surrounding visible areas of windows 302. Electrodes 304 and 306 may be formed as thin films or metal paints. Additionally, exemplary conductive materials may include copper, and aluminum, although any suitable material may be used in a manner consistent with principles of the invention. In one implementation, electrodes 304 and 306 may be deposited on an inner surface 308 of housing 110 by known means including, but not limited to, printing, painting, chemical vapor deposition, sputtering etc.

In an alternative embodiment (not shown), electrodes 304 and 306 may include a transparent conductive material formed over an entirety of each window 302. Such an electrode may be deposited over an inner surface of windows 302 by means such as physical vapor deposition, sputtering, chemical vapor deposition, i.e., heat stimulated, and/or radio frequency stimulated or the like. In one exemplary implementation, such transparent electrodes layers may include highly doped metal oxides such as $SnO_2$:F, $SnO_2$:Sb, $In_2O_3$:Sn (ITO), $Cd_2SnO_4$, ZnO:Al, and ZnO:In having thicknesses ranging from approximately 100 nm to approximately 500 nm. Alternatively, any other suitable substantially transparent or semi-transparent conductive metal oxides or metal sulfides having semiconductor properties may be used. In this embodiment, electrodes 304 and 306 may be effectively transparent to the passage of visible light, such that the light can reach underlying layers described in detail below.

In accordance with implementations consistent with the invention, contacts 305 and 307 may be operatively connected to electrodes 304 and 306 for applying a voltage thereto. Contacts 305 and 307 may be formed of metal or any suitable conductive materials.

Following formation of electrodes 304 and 306, conductive polymer layers 310 and 312 may be formed over electrodes 304 and 306, respectively in any suitable manner. In one implementation, conductive polymer layers 310 and 312 may be formed by spin-coating or painting of the polymer in a liquid or fluid state. Additional conductive polymer layers 310 and 312 may be applied by brushing, printing processes, spraying, dipping, and roller-coating techniques. The polymer may then be permitted to dry prior to further assembly. In one embodiment, conductive polymer layers 310 and 312 may be dried in an oven at temperatures between 80 to 200° C. However, it should be noted that drying time may depend on factors such as the thickness of the applied layers, ambient temperature, air humidity, etc.

In one exemplary embodiment, conductive polymer layers 310 and 312 may be formed of poly(3,4-ethylenedioxythiophene) doped with poly(styrene sulphonic acid) hereinafter referred to as PEDOT:PSS. PEDOT:PSS may alternate between substantially transparent and a substantially opaque dark blue visual states depending on voltages applied thereto. More specifically, the light absorption characteristics of PEDOT:PSS change depending on a state of the material. In a oxidation state, in which the conductive polymer loses ions, PEDOT:PSS exhibits substantially transparent characteristics. Conversely, in a reduction state, in which ions are injected or driven into the material, PEDOT:PSS exhibits a substantially opaque dark blue color. Examples of suitable PEDOT:PSS materials may include Baytron® P by H. C. Starck. In accordance with principles of the invention, conductive polymer layers 310 and 312 may have thicknesses ranging from approximately 100 nm to approximately 5000 nm.

In addition to PEDOT:PSS, various alternate conductive polymers may be used in accordance with principles of the invention. Such additional materials may exhibit different light absorption characteristics resulting in different display colors.

In accordance with principles of the invention, inner surfaces 320 and 322 of conductive polymer layers 310 and 312, respectively, may be painted or otherwise colored to provide a show-through color during such times as their respective conductive polymer layers 310 and 312 are in a substantially transparent state.

Following drying of conductive polymer layers 310 and 312, an electrolyte layer 318 may be formed over and between inner surfaces 320 and 322 of conductive polymer layers 310 and 312, respectively. The electrolyte may be a water-based salt mixture, liquid, gel or a solid (e.g., a solidified polymer electrolyte). In one embodiment consistent with principles of the invention, electrode layer 318 may be formed in a gel or liquid state and permitted to dry.

Application of suitable voltages from power supply 240 to electrodes 304/306 and operate to force ions to travel to and from the respective conductive polymer layers 310 and 312 through electrolyte layer 318, thereby resulting in alternating blue and transparent states for conductive polymer layers 310 and 312. As described above, the use of materials other than PEDOT:PSS may result in color states other than those described above.

In accordance with one implementation consistent with principles of the invention, contacts 305 and 307 may be supplied power from power supply 240 in an alternating manner such that alternating polarity of an applied voltage results in an alternating change in color of each respective conductive polymer layer 310 and 312. For example, a first application of voltage to layers 310 and 312 may result in a transparent conductive polymer layer 310 and a colored conductive polymer layer 312, while a reversed voltage application may result in a colored conductive polymer layer 310 and a transparent conductive polymer layer 312. By applying suitable colors to inner surfaces of conductive polymer layers 310 and 312, a desired design and display effect may be realized. In one implementation consistent with principles of the invention, transition of the conductive polymer layers from a first non-colored state to a second colored state may be affected by voltages in the range of approximately 0.6 volts to 2.0 volts, resulting in a corresponding current on the order of several µA, depending on relatives sizes and thicknesses of conductive polymer layers 310 and 312.

Figure 3B:
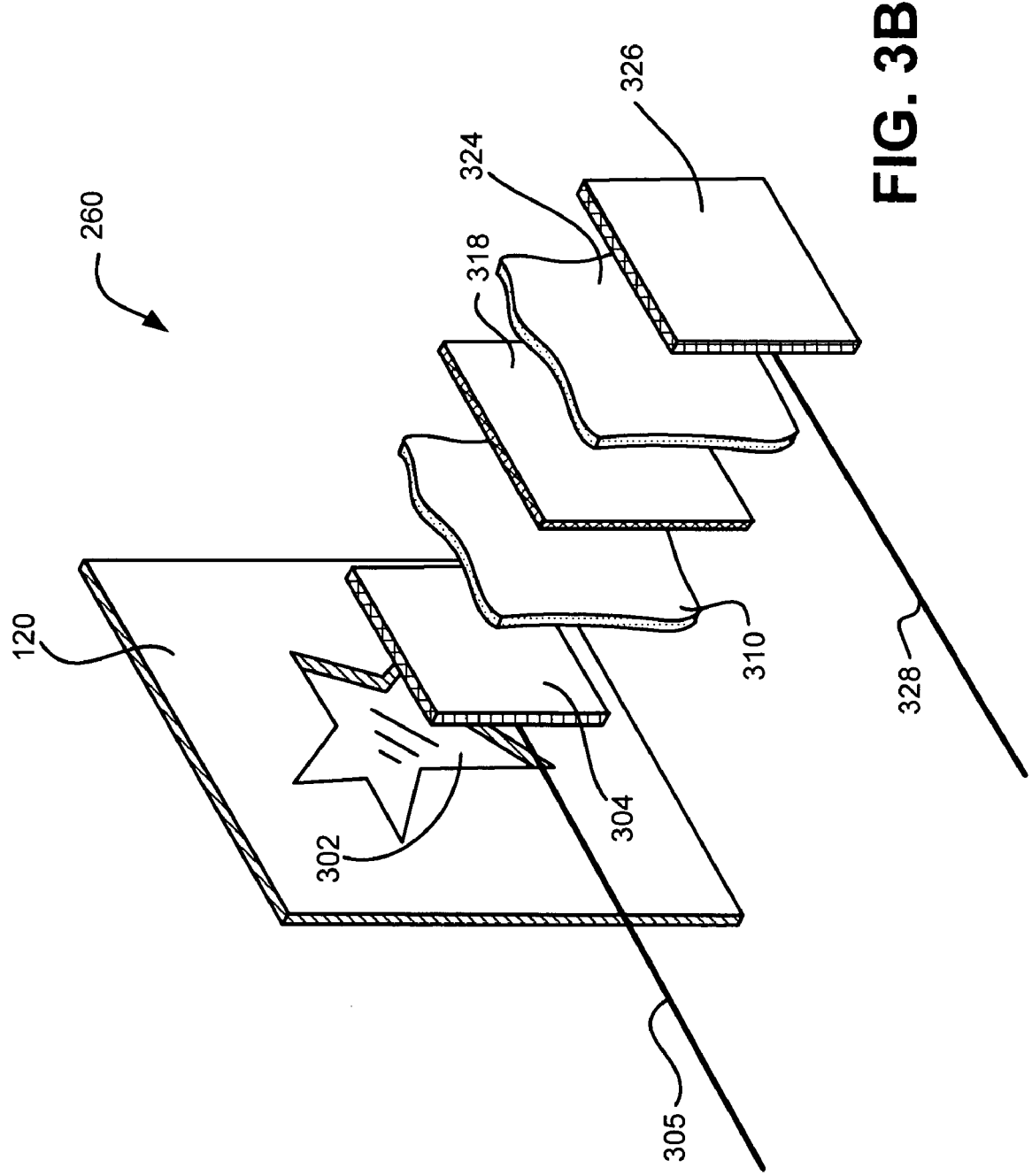

FIG. 3B is an exploded isometric illustration of an implementation of configurable display area 120 according to another implementation consistent with principles of the invention. Configurable display area 120 may include window 302, transparent electrode 304, contact 305, conductive polymer layer 310, electrolyte layer 318, similar to those described above, with respect to FIG. 3A. However, in accordance with the present implementation, configurable area 120 may be formed into a stacked arrangement, further including an ion storage layer 324 and a back electrode 326 formed over ion storage layer 324. By positioning ion storage layer 324 over electrolyte layer 318 and electrically separated from conductive polymer layer 310, ions may be forced from storage layer 324 through electrolyte 318 upon application of voltage across electrodes 304 and 326. As described in detail above, electrode 304 may be formed of a metal film or foil surrounding window 302. Ion storage layer may include any suitable material, including a conductive polymer material similar to the material of conductive polymer layer 310. Back electrode 326 may be formed in any suitable manner of a conductive material. A contact 328 may be operatively connected to back electrode 326 to provide for application of a voltage from power supply 240.

In addition to the stacked structure, FIG. 3B further illustrates that window 302 may be formed into a design or shape, such as a star, etc. It should be understood than any desirable shape may be used in accordance with principles of the invention, provided that the shape physically fit into housing 110.

Alternatively, a mask layer (not shown) may be provided between window 302 and conductive polymer layer 310 such that desired shapes for display 120 may be provided.

Figure 4:
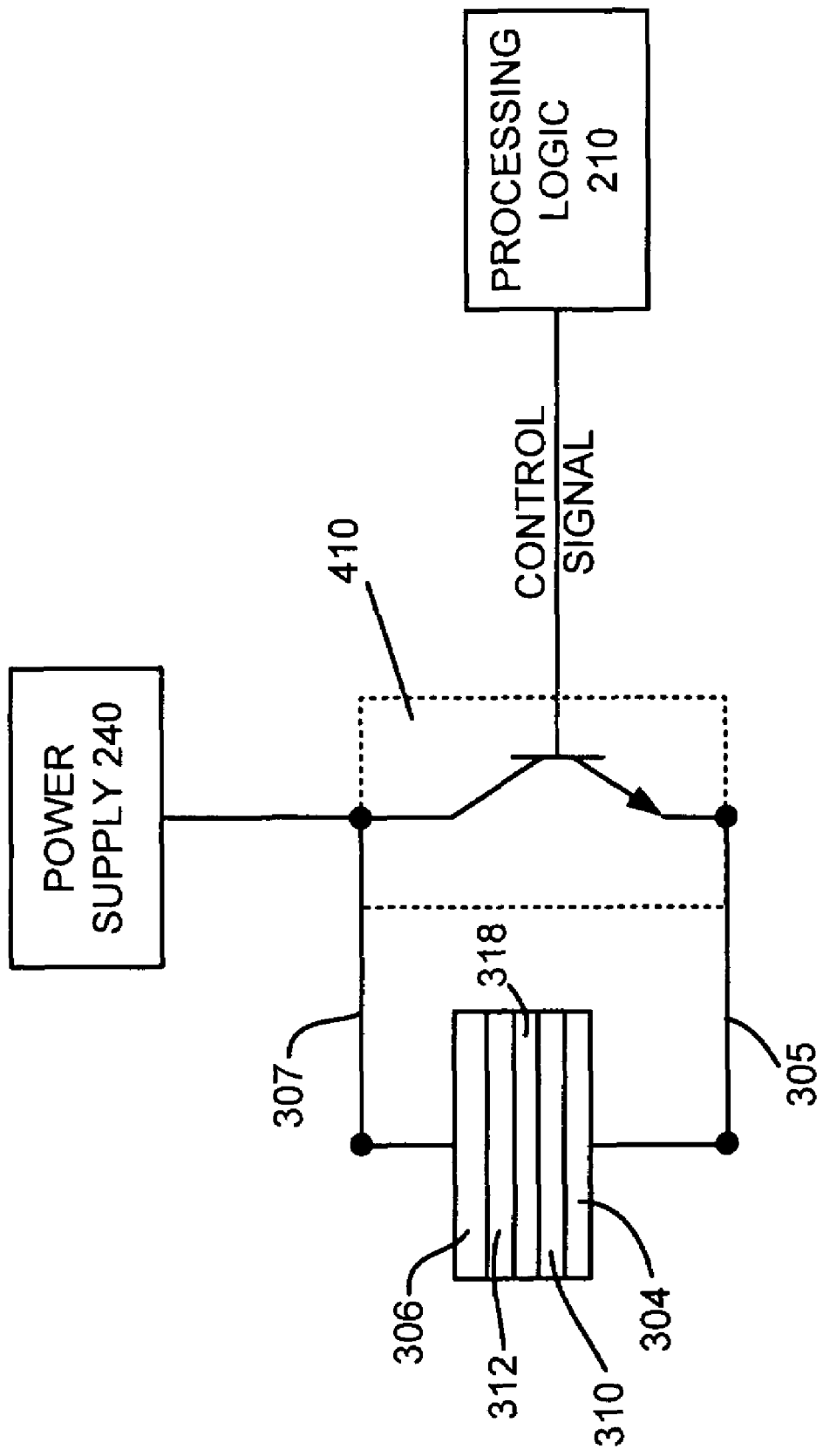
FIG. 4 is a diagram illustrating an exemplary system for supplying power to a conductive polymer layer consistent with the invention.

FIG. 4 is a diagram illustrating an exemplary system for providing a voltage to electrodes 304 and 307 in an implementation consistent with the invention. A system for providing voltage to electrodes 304 and 326 as shown in FIG. 3B may be configured in a similar manner. Referring to FIG. 4, transistor switch 410 may be coupled to contacts 305 and 307 and may also be coupled to processing logic 210. In an exemplary implementation, power supply 240 may provide, for example, 1.0 volts to contacts 305 and 307. Processing logic 210 may provide a control signal to switch 410 based on the particular operating mode associated with mobile terminal 100. For example, in response to a user action or other event, processing logic 210 may send a control signal to transistor switch 410 to create a conductive path from power supply 240 through switch 410 to effect ion flow through or away from first conductive polymer layer 310 and into or away from second conductive polymer layer 312. The control signal from processing logic 210 may be a pulse width modulated signal that allows the duration of the pulse to be set based on the particular system requirements. In this manner, power is supplied to contacts 305 and 307 under control of processing logic 210 to allow conductive polymer layers 310 and 312 to transition from the alternate non-colored and colored states. Power may be supplied to electrodes 304 and 326 in a similar manner (i.e., to contacts 305 and 328 under control of processing logic 210 via a transistor switch). In this manner, a controlled and configurable display or appearance may be provided.

In an additional implementation consistent with principles of the invention, by using a number of transistor switches 410, individual conductive polymer layers may be addressable via processing logic 210 to effect a desired appearance or function. For example, consecutive conductive polymer layers may be sequentially placed into a colored state, resulting in a marquee appearance. Alternatively, adjacent conductive polymer layers may be reversed to create a "flashing" display. By selecting applying voltages across conductive polymer layers, processing logic 210 may modify the color states of the various conductive polymer layers. In one embodiment consistent with principles of the invention, users may interface with input device 230 and high power display 250 to select and/or configure a visual appearance of configurable display area 260, thereby personalizing mobile terminal 100.

Figure 5:
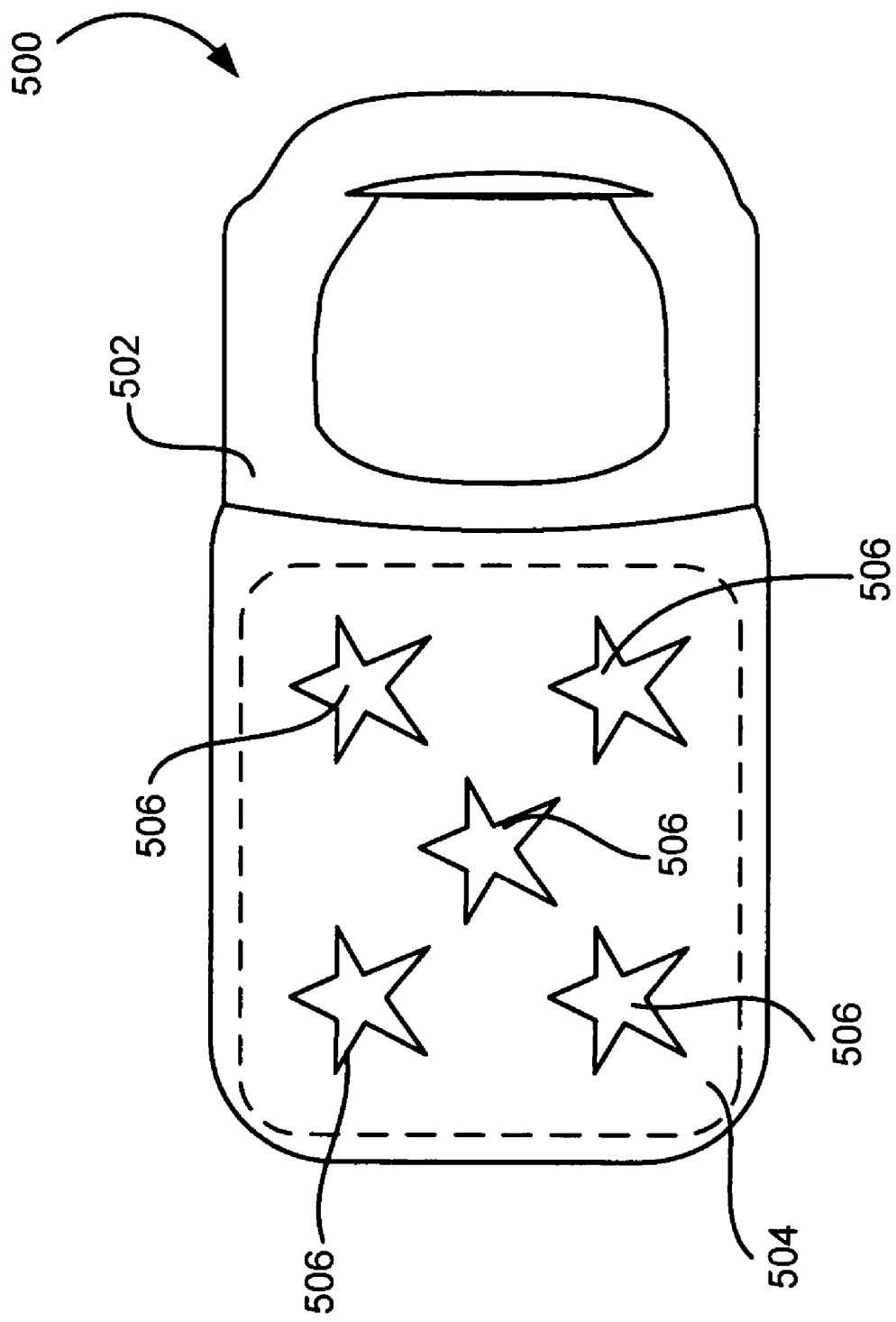
FIG. 5 is a front view of an exemplary mobile terminal in which methods and systems consistent with the invention may be implemented.

FIG. 5 is a front view of mobile terminal 500 in an implementation consistent with principles of the invention. Mobile terminal 500 may include a housing 502, a configurable display area 504, and a plurality of shaped windows 506. Behind each window 506 may be an assembly including an electrode, a conductive polymer layer, an electrolyte layer, an ion storage layer, and a back electrode layer (not shown), substantially similar to that described above with respect to FIG. 3B. By enabling deployment of addressable conductive polymer layers, a desired design or display function may be achieved. In an alternative implementation, a single transparent electrode/conductive polymer layer/electrolyte layer/back electrode layer assembly ("conductive polymer assembly) may be provided behind configurable display area 504, with windows 506 masking the conductive polymer assembly to provide a desired display.

CONCLUSION

Implementations consistent with the invention enable a physical appearance of a mobile terminal to be configurably altered using low-power conductive polymer assemblies provided within a housing for the mobile terminal. By selectively coloring or de-coloring selected regions of conductive polymers, a visual appearance or style of the terminal may be affected in a manner that uses minimal power consumption.

For example, users may interact with a menu driven system provided by the logic processor to design and enable modification of the various conductive polymers included within the configurable display. Additionally, modification of the configurable display may be configured to occur based on various identified events, such as e.g., an incoming call, an incoming message, signal strength, etc. In this manner, coloration or a visual appearance of a mobile terminal housing may be dynamically used to increase both a design and functionality of the mobile terminal.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the invention has been described in the context of a mobile terminal having as few as one and as many as five conductive polymer regions. The invention, however, may incorporate additional conductive polymer regions to provide enhance configurability for the terminal's appearance.

It will also be apparent to one of ordinary skill in the art that aspects of the invention, as described above, may be implemented in cellular communication devices/systems, methods, and/or computer program products. Accordingly, the present invention may be embodied in hardware and/or in software (including firmware, resident software, micro-code, etc.). Furthermore, aspects consistent with the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile terminal, comprising:
a housing having a window;
a first electrode formed inside the window,
wherein the first electrode comprises a frame formed inside the window;
a conductive polymer layer formed over the first electrode;
an electrolyte layer formed over the conductive polymer layer;
an ion storage layer contacting the electrolyte layer;
a second electrode contacting the ion storage layer; and
a power supply for providing a voltage to the first electrode and the second electrode,
where a state of the conductive polymer layer changes from a first uncolored state to a second colored state upon application of the voltage; and
where the changing of the state of the conductive polymer layer modifies a visual appearance of the housing.

2. The mobile terminal of claim 1, where the window is a transparent window.

3. The mobile terminal of claim 2, where the housing includes a plurality of transparent windows.

4. The mobile terminal of claim 3, where the plurality of transparent windows are formed into a preconfigured design.

5. The mobile terminal of claim 1, where the electrode comprises a conductive metal.

6. The mobile terminal of claim 1, where the conductive polymer layer is viewable through the window.

7. The mobile terminal of claim 1, where the first uncolored state corresponds to an oxidation state of the conductive polymer layer and the second colored state corresponds to a reduction state of the conductive polymer layer.

8. The mobile terminal of claim 1, where the conductive polymer layer comprises poly(3,4-ethylenedioxythiopene) doped with poly(styrene sulphonic acid).

9. The mobile terminal of claim 1, where the conductive polymer layer is applied by spin coating.

10. The mobile terminal of claim 1, where the conductive polymer layer has a thickness ranging from about 100 nm to about 5000 nm.

11. The mobile terminal of claim 1, where an inner surface of the conductive polymer layer is painted.

12. The mobile terminal of claim 1, where the electrolyte layer comprises a salt applied as a gel.

13. The mobile terminal of claim 1, where the housing includes a second window, wherein the second electrode is formed inside of the second window, and wherein the ion storage layer comprises a second conductive polymer layer formed over the second electrode.

14. The mobile terminal of claim 1, where the state of the conductive polymer layer is changed from a first uncolored state to a second colored state upon application of a voltage ranging from about 0.6 volts to about 2.0 volts.

15. The mobile terminal of claim 1, further comprising:
a transistor element operatively coupled to the power supply and the conductive polymer layer; and
logic configured to address the transistor element to provide power from the power supply to the conductive polymer layer.

16. The mobile terminal of claim 1, the housing having a second window, further comprising:
the second electrode formed inside the second window; and
a second conductive polymer layer formed over the second electrode;
where the electrolyte layer is formed over and between the conductive polymer layer and the second conductive polymer layer, where a state of the conductive polymer layer changes from a first uncolored state to a second colored state and a state of the second conductive polymer layer changes from a first colored state to a second uncolored state upon application of the voltage; and where the changing of the state of the conductive polymer layer and the second conductive polymer layer modifies a visual appearance of the housing.

17. A method for changing an appearance of a mobile terminal, comprising:

providing a mobile terminal housing with a window;

forming a first electrode over the window, where the first electrode comprises a metal frame formed over the window;

forming a conductive polymer layer over the electrode layer;

forming an electrolyte layer over the conductive polymer layer;

forming an ion storage layer in electrical connection with the electrolyte layer;

forming a second electrode in electrical connection with the ion storage layer; and applying a voltage to the first electrode and the second electrode, where applying the voltage causes the conductive polymer layer to transition from a first visual state to a second visual state.

18. The method of claim 17, where the window is formed of a mask design.

19. The method of claim 17, where the window comprises a majority of a surface of the housing.

20. The method of claim 17, where the first visual state is a substantially transparent visual state and the second visual state is a substantially opaque state.

21. The method of claim 17, further comprising:

applying a first voltage between the first electrode and the second electrode to change the conductive polymer layer from the first visual state to the second visual state; and applying a second voltage opposite to the first voltage between the first electrode and the second electrode to change the conductive polymer layer from the second visual state to the first visual state.

22. A system, comprising:

a mobile telephone housing having a first transparent or semi-transparent region and a second transparent or semi-transparent region formed therein;

a first electrode formed behind the first transparent or semi-transparent region;

a second electrode formed behind the second transparent or semi-transparent region;

a first conductive polymer region formed behind the first electrode, the first conductive polymer region visible through the at least one transparent or semi-transparent region;

a second conductive polymer region formed behind the second electrode, the second conductive polymer region visible through the at least one transparent or semi-transparent region;

a single electrolyte layer formed over the first conductive polymer region and the second conductive polymer region; and logic configured to respond to an event, where, in response to the event, the logic causes a voltage to be supplied from a power source to the first and second electrodes, to modify a color of the first and second conductive polymer regions.

23. The system of claim 22, where the event comprises a user interaction with an input device associated with the mobile telephone.

24. The system of claim 23, where the user interaction comprises a user interaction with a menu driven display on the mobile telephone.

25. The system of claim 22, where the event comprises a mobile telephone alert.

26. The system of claim 25, where the mobile telephone alert comprises an incoming call alert.

27. The system of claim 25, where the mobile telephone alert comprises an incoming message alert.

28. The system of claim 22, where the mobile phone housing includes a plurality of transparent or semi-transparent regions configured into a design pattern.

29. The system of claim 28, where each of the plurality of transparent or semi-transparent regions include a respective electrode formed over the transparent or semi-transparent region, a conductive polymer layer formed over the electrode, and an electrolyte layer formed over the conductive polymer layer, the electrolyte layer being in electrical contact with at least one other conductive polymer layer; and where the logic is configured to selectively modify a color of each of the plurality of conductive polymer regions.

* * * * *